United States Patent [19]
Quan

[11] Patent Number: 5,230,051
[45] Date of Patent: Jul. 20, 1993

[54] DISTRIBUTED MESSAGING SYSTEM AND METHOD

[75] Inventor: Suu Quan, Campbell, Calif.

[73] Assignee: Hewlett-Packard Company, Palo Alto, Calif.

[21] Appl. No.: 577,410

[22] Filed: Sep. 4, 1990

[51] Int. Cl.⁵ ............................................. G06F 13/14
[52] U.S. Cl. ............................. 395/700; 364/DIG. 1; 364/241.7; 364/242.94; 364/242.5
[58] Field of Search ........................................ 395/700

[56] References Cited

U.S. PATENT DOCUMENTS 4,980,822 12/1990 Brantley, Jr. et al. ............... 364/200

FOREIGN PATENT DOCUMENTS 274413 1/1988 European Pat. Off. .
366583 9/1989 European Pat. Off. .

OTHER PUBLICATIONS

B. R. Millard et al., "The Publicly Accessible Capability Switchboard. . . ".
"Rochester's Intelligent Gateway," pp. 54-68 by Keith Lantz et al., (Oct. 1982).

*Primary Examiner*—Gareth D. Shaw
*Assistant Examiner*—A. Katbab

[57] ABSTRACT

A computer based message passing system and method provides reliable, versatile, portable and robust data communication between processes. The message passing system and method is adapted for use with one or more computers for controlling the message passing system and method. The message passing system and method includes a shared memory area in which data regarding the status and location of application processes and computers are stored. Any intelligent subsystem participating in the message passing system and method can query the shared memory for information. One subsystem monitors the location and status of application processes and updates the shared memory area as needed. Another subsystem routes messages from one process to another, and ensures that the messages are delivered properly. A mailbox feature is provided to hold messages in cases in which a destination process is not able to receive the message at the time delivered. The message passing system and method, in its software embodiment, includes five subroutines and four utilities.

9 Claims, 11 Drawing Sheets

DISTRIBUTED MESSAGING SYSTEM AND METHOD

BACKGROUND OF THE INVENTION

Field of the Invention

This invention relates generally to electronic computer systems, and more particularly to computer based message passing systems that provide inter-process communication.

Related Art

Various systems and methods are used throughout the computer industry to communicate information from one application process to another application process. These application processes can generally be running on the same computer or on different computers. In situations in which the application processes run on different computers, a communications medium is used to carry messages from computer to computer. The systems are generally comprised of software running on a central processing unit (CPU). As is well-known in the art, the CPU is the part of a computer that executes instructions under program control. This software controls the transmission and retrieval of electronic messages sent by one process to another. As noted above, a communications medium is often used to connect multiple computers. These systems and methods each have certain drawbacks that users find disadvantageous.

One conventional system, called "pipes" is widely available but has numerous drawbacks. Although the software in a pipes system is portable (easily moved to and run in different hardware/software environments) it is not very versatile in operation. In a pipes system, messages can only be retrieved on a first in, first out (FIFO) basis. This means that the first message to arrive at the destination must be read before messages which arrived later in time. Therefore, it is not possible, for example, to retrieve the most urgent message, as would be possible in a system which used a priority scheme.

It is also not possible to retrieve a message based on message type. Retrieval by message type can be useful because it can allow retrieval of all messages for a particular project etc. which a user may want to read together. Lastly, in a pipes system, messages are deleted after they are read. The messages cannot therefore be referred back to at a later time. The aforementioned drawbacks limit the effectiveness and desirability of a pipes system.

Another conventional system uses shared memory with synchronizing semaphores to facilitate message transmission and retrieval. This system also has drawbacks that users find disadvantageous. In a shared memory system, all users are able to store messages in the same memory area. Thus, a subsequent user may write over another user's previously stored message. Moreover, there is no effective way to prevent a subsequent user from writing over a message previously stored by another user.

To overcome this, semaphores are sometimes used to mark a stored message. Semaphores are a way of electronically marking a message so that a subsequent user is notified that a current message is in storage. However, a subsequent user is still able to ignore the mark and write over the message (thus deleting it). Messages can therefore be deleted without the user ever knowing the message existed. Conventional shared memory systems then lack an acceptable degree of reliability in message transmission.

Still another conventional message passing system is built into the AT&T UNIX Operating System (System V version). UNIX System V offers a generic message queue mechanism for communicating among cooperating application processes (cooperating processes are those processes that must communicate which each other).

However, the AT&T message queue system also suffers drawbacks. For example, the AT&T message queue system does not support computer-to-computer message passing. Thus, all processes in the AT&T message queue system must reside on the same computer. Furthermore, the AT&T system is limited because it uses fixed size storage space. Thus, only a finite number of messages can be saved at any one time. Once the space is filled, new messages will be discarded. Further, in the AT&T system, messages can be retrieved only by priority or by arrival time. Messages cannot be retrieved by scanning for a particular message type. Finally, if power is lost to the AT&T system, all currently saved mail messages are lost. These characteristics exemplify the lack of versatility which plagues the AT&T message queue system.

Many of the same limitations hold true for another conventional messaging system—generic "Berkeley sockets" which are industry standard methods of communicating across processors.

The Berkeley sockets message mechanism which is better suited for a client-server environment than a distributed environment, is disadvantageous in a distributed environment because a single application process failure requires that all co-operating application processes be terminated and restarted. This termination-restart process has the disadvantageous result of disconnecting all users of the application process. These users must then reconnect after the application processes have been reactivated. The entire restart operation can be time consuming because all processes in the process group must be individually shut down and restarted. This lack of robustness (ability for same parts to continue operation when others are inoperative) is not desirable from a user viewpoint because no service is provided during the restart operation.

ISIS is a conventional messaging system developed at Cornell University in Ithaca, N.Y. ISIS addresses some of the problems of previous systems. However, ISIS also suffers from numerous drawbacks. In particular, ISIS addresses the problems of process migration (restarting terminated processes on different computers), system robustness (ability for some parts to operate when others have failed) and dynamic reconfiguration (system capability to adapt to new process locations with no administrative intervention).

ISIS does not, however, provide a "mailbox" function for saving messages that could not be received at the time of transmission. The mailbox function is very important to users because it allows messages to be saved until a user is ready to retrieve the message. This lack of versatility makes ISIS less desirable to use.

ISIS was also built to run on UNIX and UNIX-like operating systems only. It would therefore be difficult to implement ISIS on other kinds of operating systems. This lack of portability limits the usefulness of ISIS to a small segment of computer users.

ISIS has over 150 subroutines, and it is time consuming and difficult to learn to use and operate because of this large number of subroutines. ISIS also uses a complex token passing protocol which requires a special provision to handle the case where the token is lost. This protocol adds to the relative difficulty of learning ISIS. Because of the difficulty in learning ISIS, ISIS is better suited for use by software engineers, not customers and applications engineers. Additionally, the full complement of UNIX I/O calls, message calls, semaphores, signals, and timers could not be used under ISIS, because UNIX blocking system calls and ISIS calls cannot effectively be used in the same environment.

Therefore, a long-felt but unfilled need has existed and continues to exist in the art for a computer based message passing system that provides a reliable, robust, versatile, and portable message passing capability which is also easy to learn and operate.

The present invention meets this need by solving many of the problems of the prior art while avoiding many of its drawbacks.

SUMMARY OF THE INVENTION

The present invention includes a computer based message passing system and method through which independent processes communicate. The message passing system provides reliable, versatile, portable, and robust data communication between application processes running on the same or different computers. The message passing system thereby addresses the limitations and disadvantages of conventional systems and provides an improved system for interprocess communication.

In a preferred embodiment, the present invention includes software which runs on one or more computers for controlling the transmission and retrieval of messages and general operation of the message passing system. This software accepts messages from application processes and sends each such message to a destination process designated by the application process which originated it.

To ensure the proper delivery of a message, the present invention includes various sub-processes embedded in the software. These sub-processes keep track of the application processes and computers that are participating in the message passing system. By keeping track of the location and status of the application processes and computers, these sub-processes are able to effectively deliver messages with no human operation intervention. These software sub-processes also perform other tasks relating to the addressing and delivery of messages, the notification of error conditions, and the manner in which received messages can be stored and read. The invention operates in a fully distributed manner; the failure of one computer or process does not affect the continued operation of other participating computers and processes.

In one embodiment, a message passing system according to the present invention operates on a plurality of computers each of which functions independently of the others. Each computer runs distributed messaging software which is identical to that run by each of the other computers. The computers use a communications medium to carry messages. In conjunction with the communications medium, the invention provides plural processes for routing messages from one computer to another. These processes for routing messages are responsible for ensuring that messages are delivered to the correct destination. The present invention does not use a token passing protocol to transfer information from process to process. In a token passing protocol, a message can only be transmitted if the sender is in possession of the token. In the present invention, however, a process can send a message when it has one to send; therefore, no time is wasted waiting for the token to arrive.

If a message cannot be delivered because a process is inactive, the message is held until the process becomes active. These held messages are not lost if the system loses power. Rather, the messages are stored in nonvolatile memory so that power losses do not impact them. The present invention also provides for message retrieval on the basis of priority, message type or first in-first out (FIFO). Further, the present invention does not use a fixed size storage space to store messages. Therefore, no messages are discarded when a storage space is filled. Thus, the present invention provides a highly reliable system and method for message passing.

The system of the present invention includes a feature whereby the location and status of a process are shared with any cooperating processes. This feature enables any process desiring to send a message to one of its cooperating processes to determine the location of the process to which the message is to be sent. Cooperating processes are those that together comprise a process group. These cooperating processes communicate with each other in order to facilitate the operation of same user application. This sharing is done by providing a shared memory area for storing the data relating to the location and status of the processes. Thus, each process in the messaging system can instantly determine which processes are operating on which computers. This determination is necessary so that messages can be routed to the proper process.

The invention also includes a feature whereby the status of a process can be monitored. By so monitoring, it is readily determined when a process is active or inactive. This feature will detect the failure of a process as part of its monitoring function.

Once a process failure has been detected, the present invention is able to recover from the failure without requiring the termination and restart of all processes in the process group affected. This is a very important function, because restart operations are time consuming and result in the preclusion of service during the restart operation. This recovery operation allows application processes which have failed or otherwise terminated to be moved to a different computer and be reactivated on the different computer without manipulating static configuration tables in the system. This dynamic reconfiguration aspect of the present invention exemplifies the robustness of the invention.

Each application process in this message passing system is responsible for its own independent operation. The independence of each application process adds to the robustness of the present invention. This independent operation includes the function of "broadcasting" the particular location of an application process in the message passing system. Location in this context refers to the computer on which that process is operating.

Broadcasting is an electronic communications technique in which the source sends a message that all communicating entities read, i.e., the message is not addressed for delivery to a particular destination. Thus, in the present invention, when an application process is activated, the process posts its location and status on a bulletin board associated with each processor. Posting at remote processors is done via the communications network (which inter-connects the computers).

No human intervention is required in the present invention to update static configuration tables to inform other application processes of the new location and status of the subject application process. Rather, as noted above, an electronic "bulletin board" is provided for storing the location of each application process in the network. This bulletin board feature provides much easier use of the invention than systems that do not utilize a bulletin board approach.

This bulletin board is a shared memory segment in the form of a table, which includes information on (1) the application process location (i.e., which computer it is operating on), (2) the status of the application process (e.g., active or inactive) and (3) pertinent data such as the host machines involved and ho to channel data to them, including communication medium, data encoding schemes, communication protocols, and relay information. In order to determine the status and location of an application process, the status and location data can be examined. This examination is carried out by querying the bulletin board. Therefore, any intelligent subsystem on the network may determine the operational status of an application process by querying the bulletin board.

The message passing system and method of the invention includes logical communications processes which route messages to and from different application processes.

When a preferred embodiment of the invention is run under the UNIX operating system, these logical communications processes are denoted "logical network daemons" and have the function of forwarding a message to a remote application process. In this embodiment, these logical network daemons also ensure that incoming messages from remote application processes are delivered to the proper destination application process in a proper format.

All message traffic originating at an application process which is remote to a destination application process (i.e. the two processes are on separate computers) will be routed by both a local logical network daemon and a remote logical network daemon. If, on the other hand, an application process sends a message to a local application process (i.e. the two processes are on the same computer), then the computer sends the message directly to the destination application process, without any intervention from the logical network daemon.

Thus, application processes which are remote to one another will always communicate through logical network daemons. Both the local and remote logical network daemons comprise transmit logic and receive logic.

A single logical network daemon could be viewed as being a pair of independent daemons, with the independent functions of transmit and receive. One of the daemons is thereby dedicated to receiving messages, while the other daemon is dedicated to transmitting messages.

Additionally, there may be many of these logical pairs of logical network daemons on each computer, because one pair will exist for each of N-1 computers in the message passing system (where N is the total number of computers in the message passing system network). Thus, if there are three computers in the message passing system, each computer will have two pairs of logical network daemons associated with it (four logical network daemons in total).

The logical network daemons all communicate through their own protocol which is understood by all the logical network daemons in the messaging system. All traffic originating from remote computers is routed through logical network daemons.

The invention includes administrative processes which oversee the operation of the message passing system.

When a preferred embodiment of the invention is run under the UNIX operating system, these processes are denoted "logical administrative daemons." In this embodiment, each computer has one logical administrative daemon associated with it.

This logical administrative daemon monitors each application process on the computer and can determine if an application process has malfunctioned. It can also determine if the application process terminated naturally, but failed to broadcast its termination. When the logical administrative daemon has determined that an application process has terminated or activated, it will send that information to the bulletin board on each computer. The bulletin board will then store the information.

Logical administrative daemons also notify a destination application process when an incoming message is present.

The present invention allows programmers to easily interface with the routines and utilities of the software of the present invention because only five well-defined subroutines and four utilities are used. These subroutines and utilities are easily learned and operated. Thus, the invention is ideal for use by end users and applications engineers.

These and other advantages of the present invention will become more fully understood after reading the Detailed Description of the Preferred Embodiments, the Claims, and the Drawings which are briefly described below.

BRIEF DESCRIPTION OF THE DRAWINGS

The invention will be better understood if reference is made to the accompanying drawings in which.

DETAILED DESCRIPTION OF THE PREFERRED EMBODIMENTS

General Overview of the Present Invention

The present invention includes a computer based message passing system and method through which independent processes communicate. It provides reliable, versatile, portable, and robust data communication between application processes running on the same or different processors. The message passing system thereby addresses the limitations and disadvantages of conventional systems and provides an improved system for interprocess communication.

In a preferred embodiment, the message passing system includes software which runs on one or more computers for controlling the transmission and retrieval of messages and general operation of the message passing system.

In one embodiment of the invention, the message passing system software is written in the "C" programming language and operates on HP9000 series 320 and 350 workstations running the UNIX operating system HP-UX5.17. Only industry standard features are used as a base, including AT&T SYS V shared memory, semaphores, message queues and Berkeley 4.3 sockets. In this embodiment, all base features are controlled automatically by the utilities and subroutines of the present invention. Thus, the application programmer need not learn such intricacies of Berkeley sockets, semaphores, shared memory, or message passing.

Special hardware features are generally not used in order to reduce the dependency on particular hardware. In a preferred embodiment, no assembly code is used, no floating point comparisons are required, and efficient implementation is achieved without the use of pointer increment/decrement logic.

In a preferred embodiment, each computer can load shared memory at a different address independently. This embodiment accommodates hardware such as the HP 9000/500 computer system that cannot relocate a shared memory segment. In one embodiment, the message passing system includes a plurality of computers each of which functions independently of the others. Each computer runs distributed messaging software which is identical to that run by each of the other computers. The computers use a communications medium to carry messages.

These computers can communicate, in a preferred embodiment, via an IEEE 802.3 Local Area Network, which is well known in the art. It should be understood, however that the invention could be implemented in various software and hardware, and the communications network is not limited to the 802.3 Local Area Network standard.

Indeed, the software of the present invention is not dependent on any particular operating system, software language or hardware and is therefore highly portable (can easily be moved to other hardware and software environments). Any communications medium could be used to pass messages from computer to computer, including but not limited to local area networks, wide area networks, satellite networks, and optical fiber networks.

General Operation of the Present Invention

Figure 1:
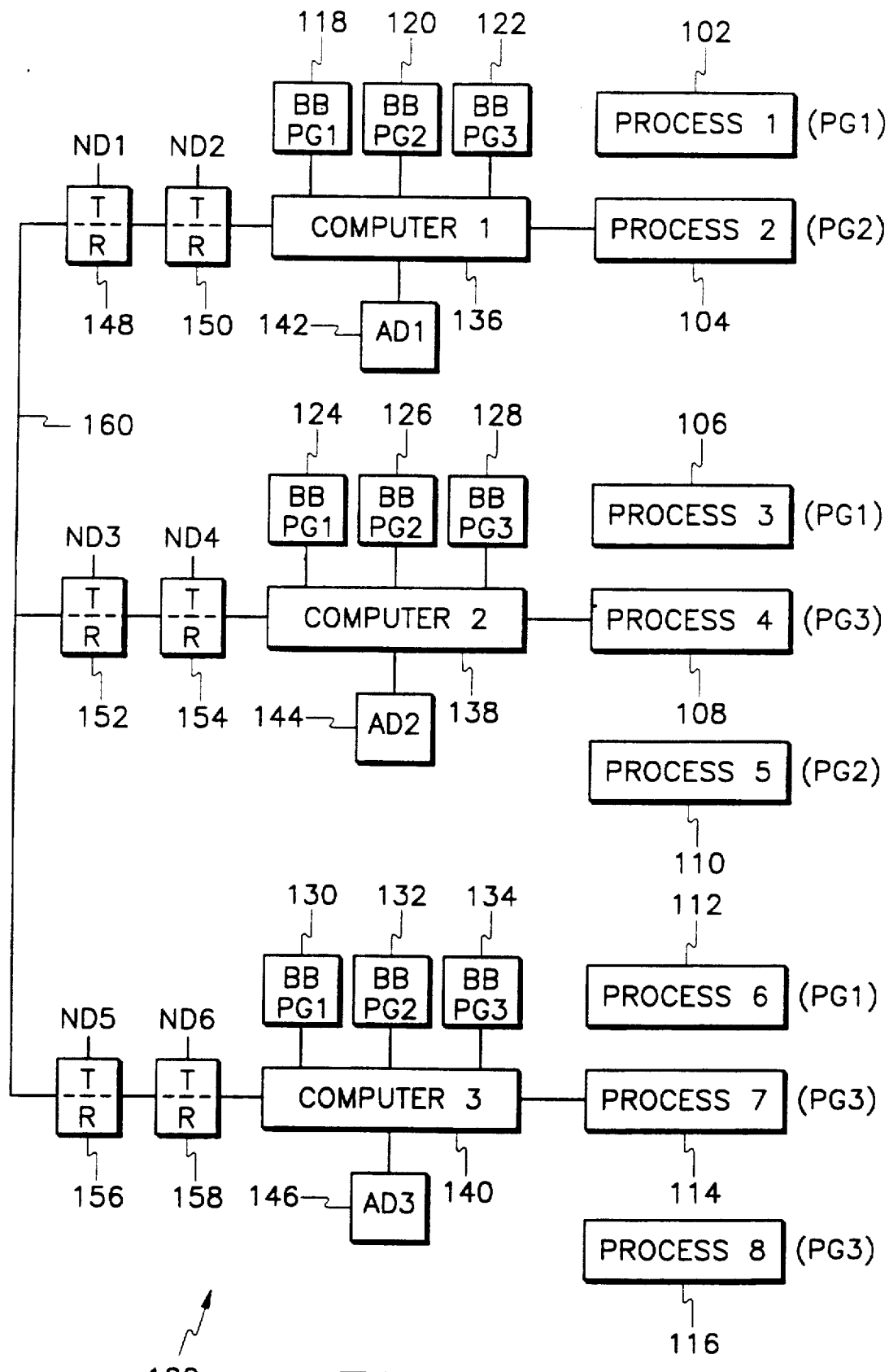
FIG. 1 shows a representative message passing system according to the invention.

Reference is now made to FIG. 1 which depicts a representative message passing system and method of the present invention. Unless noted otherwise, the actual number of each of the different types of blocks is only for purposes of illustration and does not constitute a limitation to the present invention.

In FIG. 1, eight application process are illustrated, process 1, process 2, ... process 8; and these are denoted as blocks 102, 104, 106, 108, 110, 112, 114 and 116, respectively.

These eight application process, 1–8, are arbitrarily grouped into three process groups denoted PG1, PG2, and PG3 for purposes of illustration. A process group PG1, PG2, and PG3 is comprised of co-operating application processes, that is, application processes which must communicate with each other in operation. The process groups are configured by the system administrator/operator (not shown) prior to system start-up. For the purpose of illustration only, application processes 1, 3 and 6 are designated in process group (indicated as PG1); application processes 2 and 5 are in process group 2 (indicated as PG2); and application processes 4, 7, and 8 are in process group 3 (indicated as PG3).

Within process group 1 (PG1), application processes 1, 3 and 6 are all remote from one another. This means that each application process in the group is running on a different computer, as shown in FIG. 1. In FIG. 1, application process i is running on computer 1; application process 3 is running on computer 2; and application process 6 is running on computer 3.

Process group 2 (PG2) is composed of application process 2 and application process 5. These two application processes are also remote from one another. Application process 2 is running on computer and application process 5 is running on computer 2.

Process group 3 (PG3) is comprised of application processes 4, 7 and 8. Application process 4 is remote from application processes 7 and 8. However, application processes 7 and 8 are local to each other.

As noted above, each application process 1–8 is associated with a particular computer, of which three are shown in FIG. 1 at blocks 136, 138 and 140. Each process group PG1–PG3 has a bulletin board (denoted BBPGN where N=an integer ≧1) associated with it. These bulletin boards BBPGN are duplicated on every computer so that each computer has three distinct bulletin boards associated with it, one for each of the three process groups (PG1–PG3) shown. The bulletin boards are indicated at blocks 118, 120, 122, 124, 126, 128, 130, 132 and 134. These bulletin boards store information on the status of each application process within the process group.

Communication between local application processes, such as application processes 7 and 8, is done directly. This means that the source application process will send a message to the destination application process without any use of the communications network between computers. When an application process sends a message to a remote application process (for example, application process 2 sends a message to application process 5 both of which are in process group 2), the message is routed through the communications network which comprises logical communications processes and a communications medium.

The logical communications processes are shown in FIG. 1 as ND1, ND2 ... ND6 at blocks 148, 150, 152, 154, 156 and 158. In FIG. 1, two logical communications processes NDN are shown to be associated with each computer. Each computer has (X-1) logical communications processes associated with it, where X is the number of computers active in the message passing system. Each logical communications process is responsible for receiving messages from other logical communications processes, and for transmitting messages to remote logical communications processes. Thus, as shown in FIG. 1, logical communications process blocks 148, 150...158 are noted with a "T" (transmit) and an "R" (receive).

Also depicted in FIG. 1 are three administrative processes, each denoted as AD1, AD2 and AD3 and shown at blocks 142, 144 and 146. The administrative processes are responsible for overall messaging system management, including the monitoring of application process status.

Detailed Description of the Sub-Systems and Methods

In a preferred embodiment, the software of the present invention is composed of five subroutines and four utilities. As such, the present invention is easy to learn and use.

One subroutine, called the broadcast subroutine, is initiated when an application process is activated, to broadcast the entry of the application process into the distributed messaging system. When this subroutine is activated, the bulletin boards on the different computers will register the application process and store location and status information. The subroutine will also set up the correct communication path from the newly activated application process by generating logical network daemons. The administrative processes are responsible for updating the bulletin boards when the broadcast message is sent. The administrative processes on the various computers can, if requested by the destination, signal the application process that a message is waiting to be read. The application process that has been activated and whose status has been broadcast may also request messages which were accumulated prior to the activation of the application process. Alternatively, the application process can direct that those messages be discarded. These features add to the versatility of the present invention and to the reliability of message transmission and retrieval.

Figure 2:
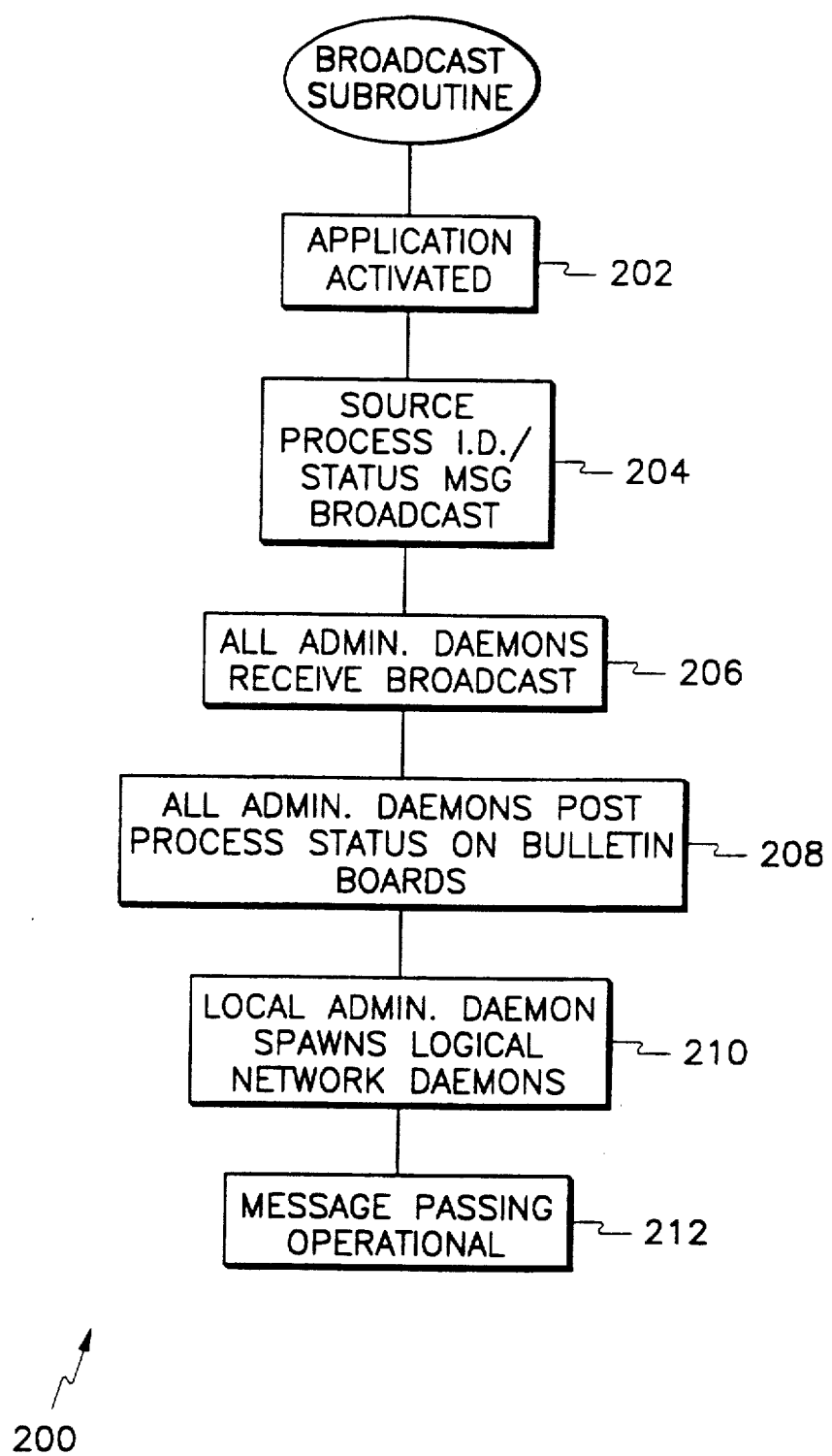
FIG. 2 is a block diagram showing the steps involved in the broadcast subroutine of the system and method of the invention.

Referring now to FIG. 2, in an embodiment run under the UNIX operating system, a block diagram shows the operation of the broadcast subroutine 200. At a block 202, the application and its associated processes are activated on a particular computer. This will generally be accomplished through operator command and control (not shown). Once the application has been activated, the processes associated with it transmit an identification/status message in a broadcast fashion, as indicated by a block 204, which will cause all the logical administrative daemons in the messaging system to receive the broadcast ID status message, as indicated by a block 206.

Each logical administrative daemon will post the application process status on the appropriate process group's bulletin board, as indicated by a block 208. The local logical administrative daemon then spawns logical network daemons if logical network daemons are not already present, as indicated by a block 210. "Spawn" is a UNIX term meaning create or generate. These daemons coordinate communication between the local application process and remote application processes. A block 212 shows that the message passing system is operational after this broadcast subroutine has been fully executed.

A second subroutine, called the connect subroutine, is used to establish a continuing connection from a source application process, where a message is sent, to a destination application process, where a message is received. This connect subroutine is useful in cases in which a large number of messages are to be sent over time. This connect subroutine is capable of establishing a connection to a destination application process both when the process is active on the remote computer and when the process is not active. The connect subroutine will create and activate logical communications processes if the application process to which connection is sought is remote. This is the only case where a logical communications process is created and activated by a routine other than an administrative process.

Figure 3:
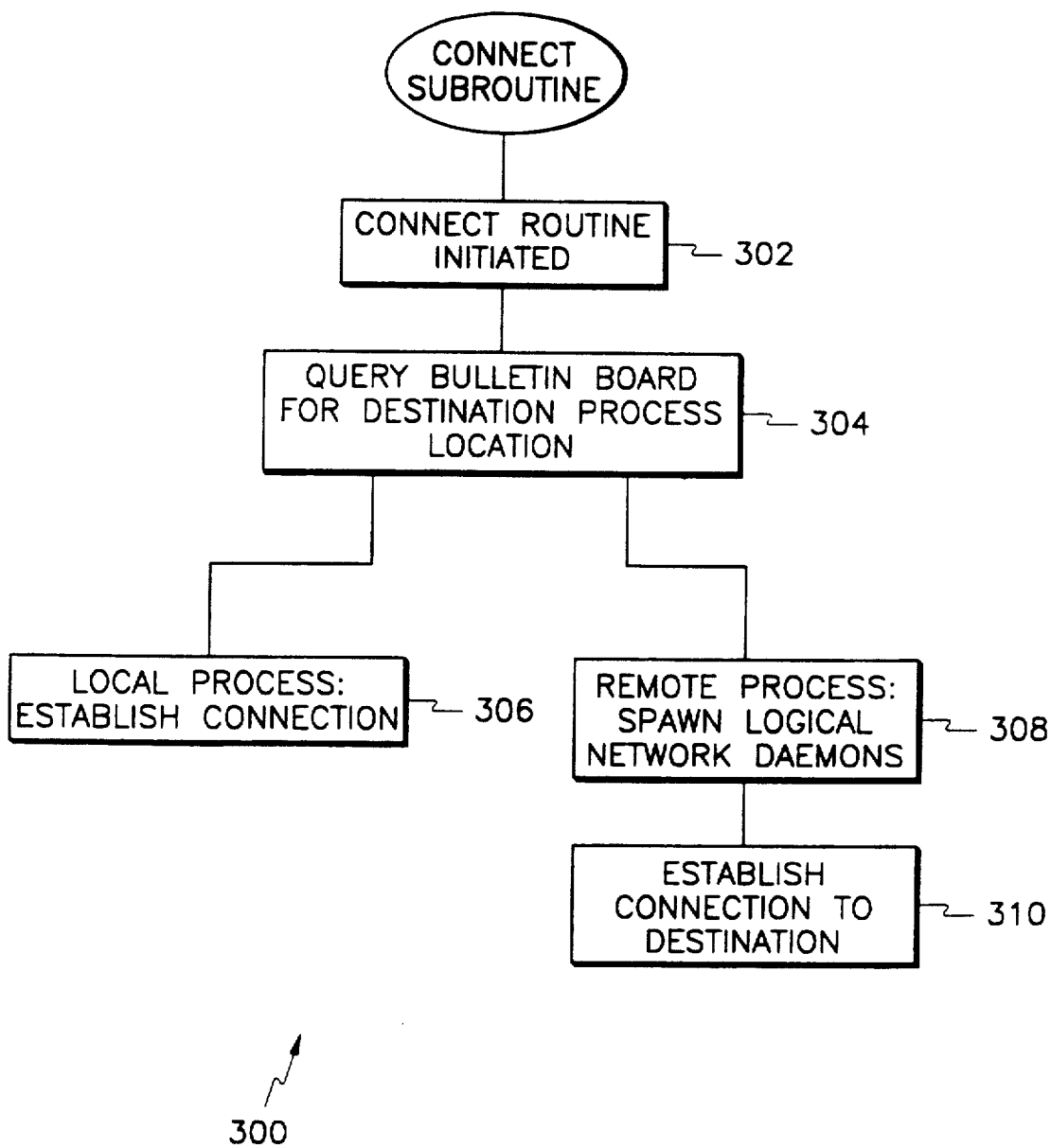
FIG. 3 is a block diagram showing the steps involved in the connect subroutine of the invention.

Referring now to FIG. 3, a block diagram shows the operation of the connect subroutine 300 in an embodiment run under the UNIX operating system.

At a block 302 it is shown that the connect routine is initiated. The input from the application to the routine will be the destination application process to which connection is to be maintained. At a block 304, it is shown that the bulletin board is queried so that the location of the destination application process can be determined. If the destination application process is local, the connection is established as shown at a block 306.

If the destination application process is remote, logical network daemons are "spawned" as shown at a block 308, and a connection is established to the destination, as shown at a block 310.

A third subroutine in the message passing system is used to send a message directly to a destination and is therefore designated the "send" subroutine.

In the case of a transmission from an application process to a local application process, the send routine performs a direct transmission to the other process, (i.e., logical communications processes are not used) and returns a completion status. This completion status will inform the source application process whether the destination application process received the message correctly.

When an application process desires to send a message to a remote destination, the send subroutine causes the message to be sent first to a local logical communications process and that local logical communications process forwards the message to the remote logical communications process associated with the destination computer. The remote logical communications process will query the appropriate bulletin board, and will deliver the message to the remote process by storing the message in a memory area called a "mailbox". The remote logical communications process will then notify the application process (if the application process is active) of the message. This mailbox feature enhances the reliability of the present invention by ensuring that messages are not discarded before being read.

The send subroutine can be configured to transmit messages in a "waiting" or "nonwaiting" status. If the message has a non-waiting status, then the send subroutine will return to the main program immediately after the delivery process is initiated, but before the delivery process is complete. If the message is sent with waiting status, then the send subroutine will not return to the main program until the delivery process is complete.

This wait/non-wait feature allows a process to optimize either speed (non-wait) or reliability through confirmation (wait). The send subroutine will also attach information onto the message which identifies the source application process and the destination application process, and it will also time stamp the message.

Figure 4:
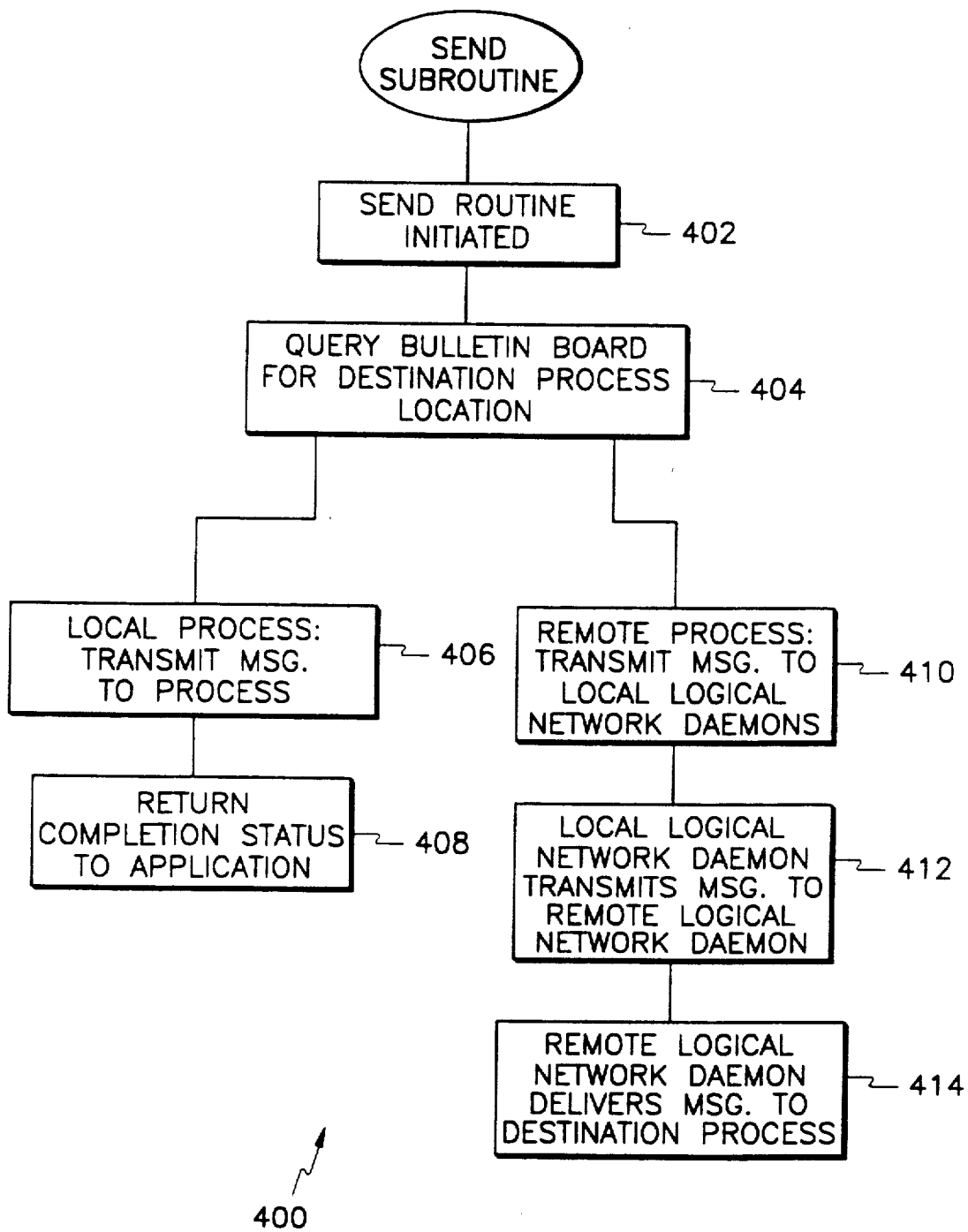
FIG. 4 is a block diagram showing the steps involved in the send subroutine of the invention.

Turning now to FIG. 4, a block diagram depicts the operation of the send subroutine 400 in an embodiment run under the UNIX operating system. At a block 402 it is shown that the send routine is initiated. The input from the application to the routine will be the destination application process to which the message is to be transmitted. At a block 404, it is shown that the bulletin board is queried so that the location of the destination application process can be determined. If the destination application process is local, the message is transmitted to the process, as shown in a block 406. The send subroutine will then return to the application a completion status which informs the application of whether the message transmission was successful as shown in a block 408.

When the bulletin board is queried at block 404 and it is determined that the destination application process is remote, the message is transmitted to the local logical network daemon as shown at a block 410. The local logical network daemon then transmits the message through the network to the remote logical network daemon on the remote computer as shown at a block 412. The remote logical network daemon then delivers the message to the destination application process as shown in a block 414 with a waiting or nonwaiting status as discussed above.

Thus, for purposes of illustration, referring back to the representative message passing system of FIG. 1, a message originating at application process 1 which is being sent to application process 6 will be treated as follows. Application process 1 will query bulletin board PG1 (the bulletin board for process group 1) to determine the location of application process 6. The bulletin board will inform application process 1 that application process 6 is a remote process. Application process 1 will then send its message to logical communications process ND1 for transmission across the network.

Logical communications process ND1 will forward the message to logical communications process ND6. Logical communications process ND6 will then query bulletin board PG1 to determine if application process 6 is in fact located on computer 3 and, if so, if the process is active. If application process 6 is active, logical communications process ND6 will relay the message to application process 6. If application process 6 is not active, then logical communications process ND6 will hold the message until application process 6 becomes active.

A fourth subroutine, called the receive subroutine, facilitates the reception of messages based on configurable parameters. This receive subroutine can be configured to receive messages by a priority scheme, or on a first came, first serve basis, or by message type. The different types of messages can be configured in the message passing system to accommodate this parameter. The capability to select messages based on a broad range of criteria is a feature desired by many users.

Figure 5:
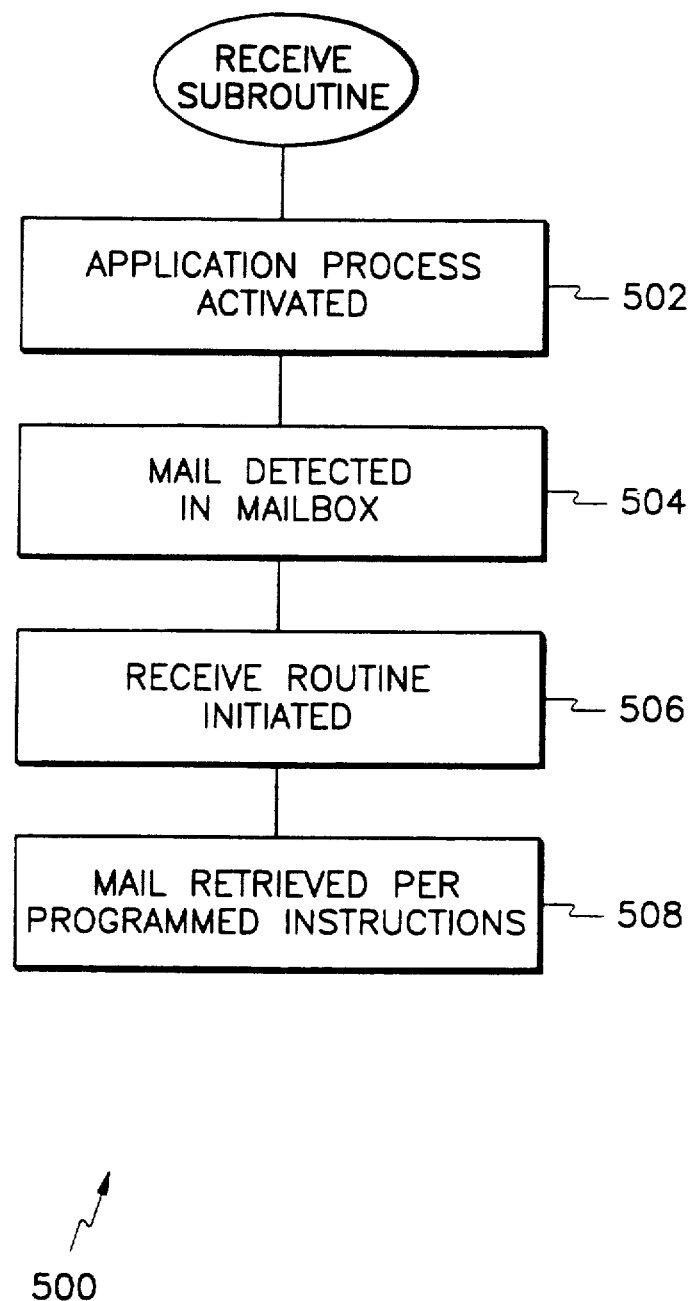
FIG. 5 is a block diagram showing the steps involved in the receive subroutine of the invention.

Referring now to FIG. 5, a block diagram depicts the operation of the receive subroutine 500 in an embodiment run under the UNIX operating system.

At a block 502, it is shown that an application process is activated. It is contemplated by the invention that this process may be activated either by a human operator or administrator or by an automatic activation technique. Once the application process has been activated, the application process then will detect any mail currently residing in the mailbox as shown at a block 504. If mail is detected in the mailbox, then the application process will initiate the receive routine as shown at a block 506.

When the receive routine is initiated, the mail in the mailbox is retrieved by the application process per program instructions as shown at a block 508. These programmed instructions could include instructions to retrieve messages based on priority, on a first-come, first-served basis (i.e., the message which arrived first in the mailbox will be the message which is first read by the application process), or based on message type, which can be configured by the system administrator.

Finally, the broadcast-off subroutine announces that the application process is leaving the system and will remain in an inactive status until reactivated. In the normal course of operation, each application process prior to terminating should initiate the broadcast-off routine. If the application process is inactive but has not, for some reason, transmitted a broadcast-off message, then the local administrative process will, in time, perceive that the application process is down and will update the bulletin board to reflect the inactive status.

In an embodiment run under the UNIX operating system, the local administrative process recognizes that the application process is down through use of a special semaphore. All cooperating processes set a common semaphore to a non-zero value (generally 1). When an application process terminates, UNIX changes the value of this semaphore to 0. UNIX then notifies the administrative process of the change.

Figure 6:
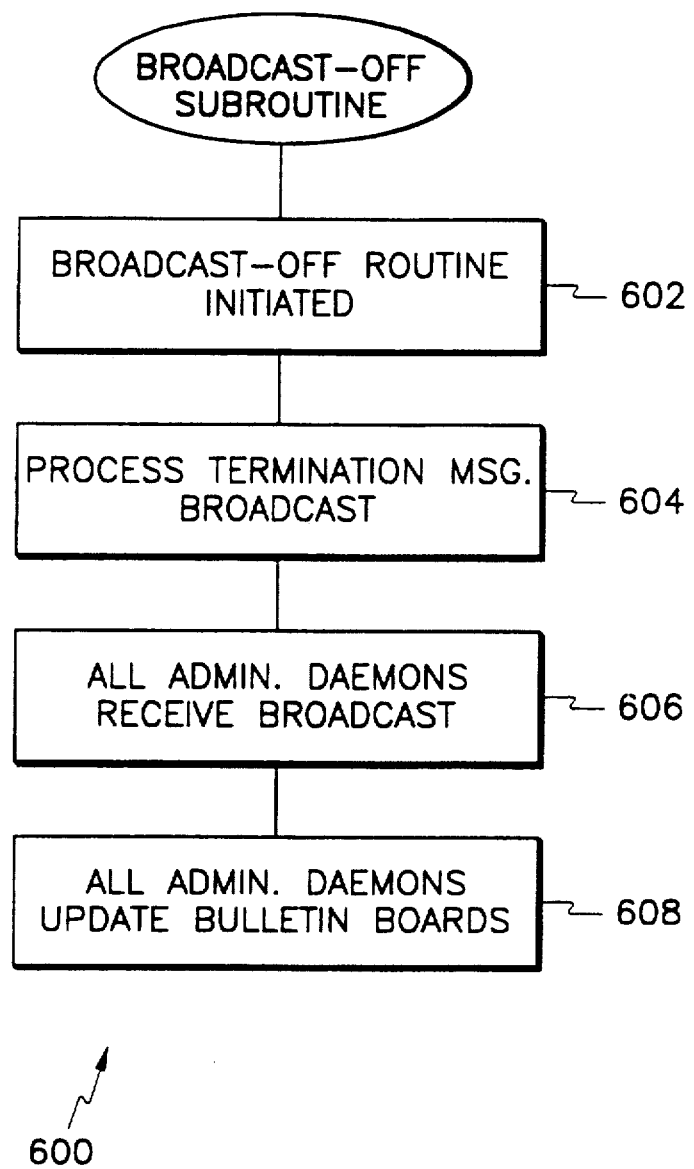
FIG. 6 is a block diagram showing the steps involved in the broadcast off subroutine of the invention.

Referring now to FIG. 6, a block diagram depicts the operation of the broadcast-off subroutine 600 in an embodiment run under the UNIX operating system. At a block 602, it is shown that the broadcast-off subroutine is initiated by an application process. Once the broadcast off subroutine has been initiated, the subroutine causes a process termination message to be sent across the network in a broadcast fashion as indicated at a block 604. Because the termination message is sent in broadcast form, all logical administrative daemons (one on each computer) will receive and read the broadcast message as is indicated at a block 606. These logical administrative daemons will then update their respective process group bulletin boards so that all cooperating processes in the particular process group of the process which is terminating will know that the process is no longer active.

The four utilities of the present invention are used to perform administrative and other ancillary functions. Three of these utilities are well known to those skilled in the art and, hence, are only generally described below.

A configuration utility is used to initialize each bulletin board in shared memory. This utility should only be run after the computer has been re-activated. The configuration utility will also spawn any logical network daemons if any are required.

Another utility exists to de-allocate all resources back to the operating system. This utility, designated "clean", deletes all stored information relating to the location and status of processes. This utility can be used when a problem emerges involving corrupt data.

A third utility, called "check" is used to display information about a particular process, including whether any mail is in its mailbox, process location, and process status.

A fourth utility is used to add a new computer to the message passing system so that the new computer can participate. This utility can be activated on any computer currently participating in the message passing system. This "add host" utility adds a new computer by invoking the birth (creation) of a logical network daemon. This logical network daemon then obtains information about the new computer as described below and in FIGS. 7 and 8. "Birth" and "death" are UNIX terms which denote the creation and termination of a process.

Various important functions and activities are supported by the present invention. These include a capability to add new service and the steps involved in the birth, operation, and death of logical network daemons in the preferred embodiment of the UNIX operating system.

Figure 7:
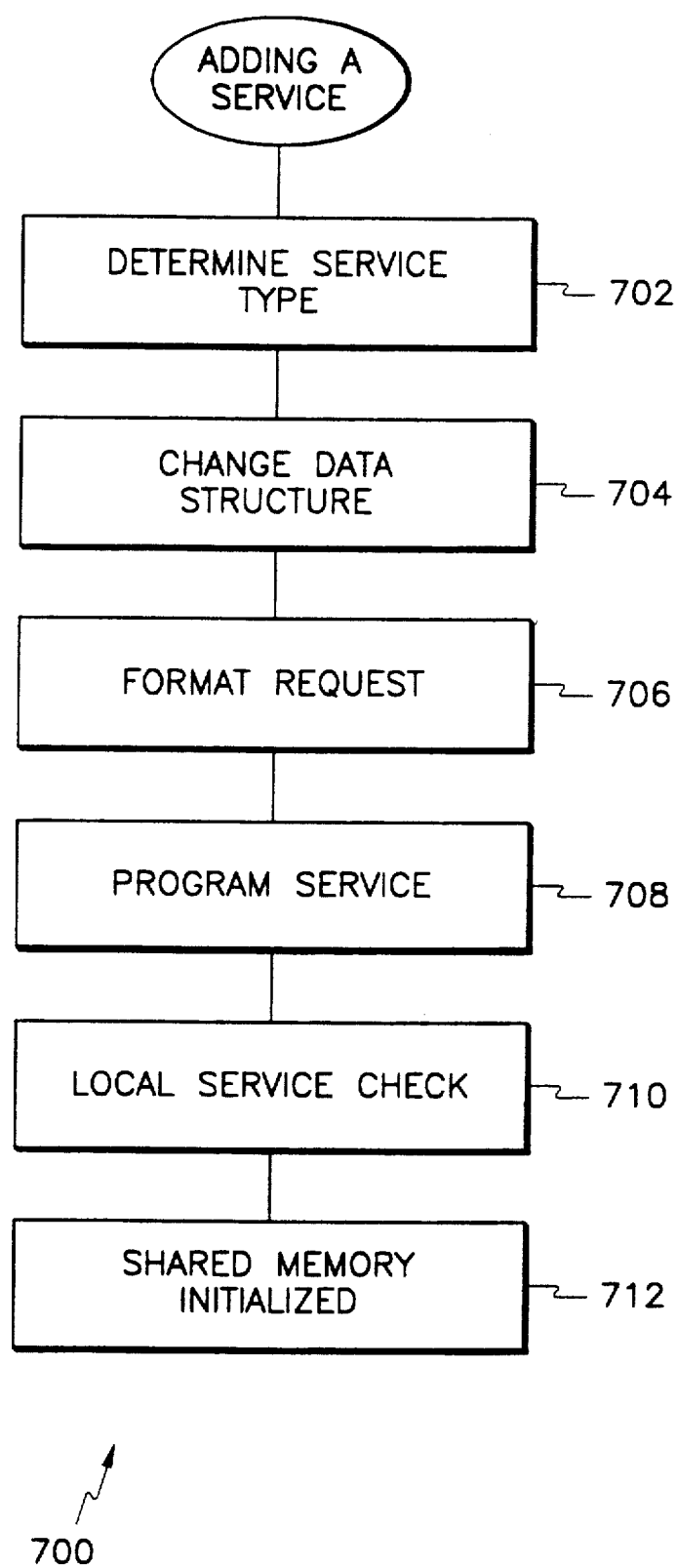
FIG. 7 is a block diagram showing the steps involved in adding a message passing service.

Referring now to FIG. 7, a block diagram depicts the steps involved in adding a message passing service in an embodiment run under the UNIX operating system. This feature allows new services to be added to the present invention and thus increases the versatility of the invention.

At a block 702, it is shown that the service type must be determined. The service type is an integer number which uniquely identifies a particular service. In a preferred embodiment, the service type number can contain 12 digits. In same cases, the data structure may need to be changed as shown at a block 704. Whether the data structure may need to be changed will depend on the type of service which is being added and what its attributes are. As shown at a block 706, the request message must then be formatted so that it can be read by the administrative or logical network daemon.

Following the formatting of the request, the actual service must be programmed as shown at a block 708. This means that instructions must be written which tell the logical administrative daemon or the logical network daemon what actions to take when the message arrives. As shown at a block 710, a check is made to see if a local or a remote service is requested. If the service is to be executed locally, the service request must be sent to the local logical administrative daemon. However, in same cases an application process can execute a service request without using its logical administrative daemon. If the new service which is being added requires new shared memory data elements, then these elements must be initialized, as indicated by a block 712.

Initialization is a technique whereby memory space is reserved for the new shared memory data elements. In addition to reserving memory for the new service, the shared memory data elements must be synchronized across all computers which are a part of the message passing system. The initialization configuration utility program (discussed further below) is used to modify the current shared memory so that the new data elements (which constitute the new service) will have common space reserved on all computers of the message passing system.

Figure 8:
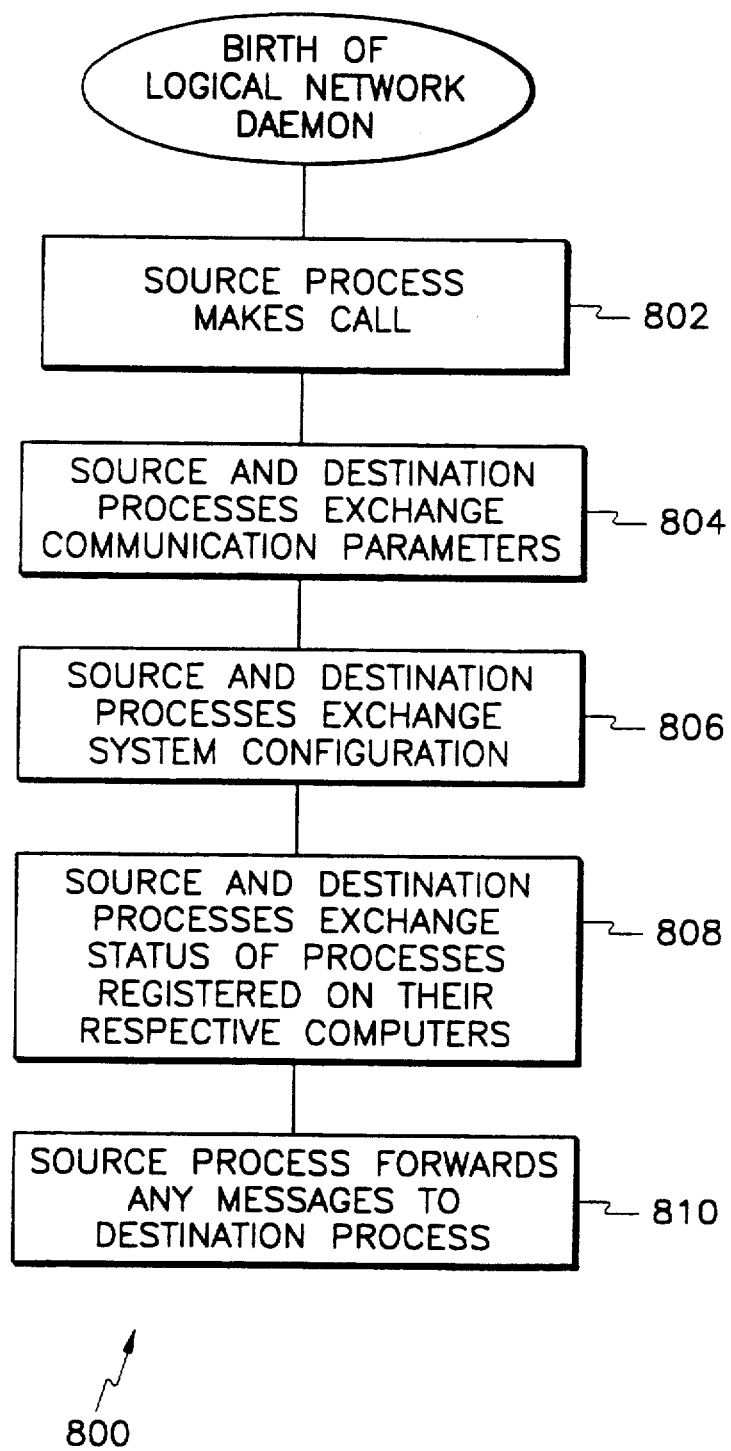
FIG. 8 is a block diagram showing the steps involved in the birth of a logical network dAemon of the invention.

Referring now to FIG. 8, in an embodiment run under the UNIX operating system, a block diagram depicts the steps involved in the birth of a logical network daemon.

At a block 802, it is shown that the source process makes a call to a destination process on a remote computer. The source and destination processes then exchange communication parameters as shown at a block 804. This information includes the code that the data will be represented by, such as ASCII (American Standard Code for Information Interchange), EBCDIC (Extended Binary Coded Decimal Interchange Code), or others. Other information may be exchanged, including protocol information represented at various layers of the International Standards Organization Open Systems Interconnection (OSI) model, whether bytes are swapped to correlate most significant and least significant, the type of integer representation (two's complement, one's complement, sign digit, etc.), floating point representation, etc. Once these communication parameters have been exchanged, each logical network daemon will then convert the data to be sent into the form that the destination daemon will understand. Thus, the conversion is made by the source prior to transmission.

Following the exchange of communication parameters, the source and destination processes exchange certain system configuration data as shown at a block 806. This information includes the identification of each computer and a copy of any information in the shared memory of each computer. Following this exchange of system configuration data, the source and destination processes exchange the status of the processes registered on their respective computers, as shown at a block 808.

The status information will include which processes are active and inactive on each computer and whether any process is holding messages, mail or other files that should be routed to the other process. As indicated by a block 810, if the source process finds any messages waiting to be sent, then the source process will accordingly forward those waiting messages to the destination process.

Figure 9:
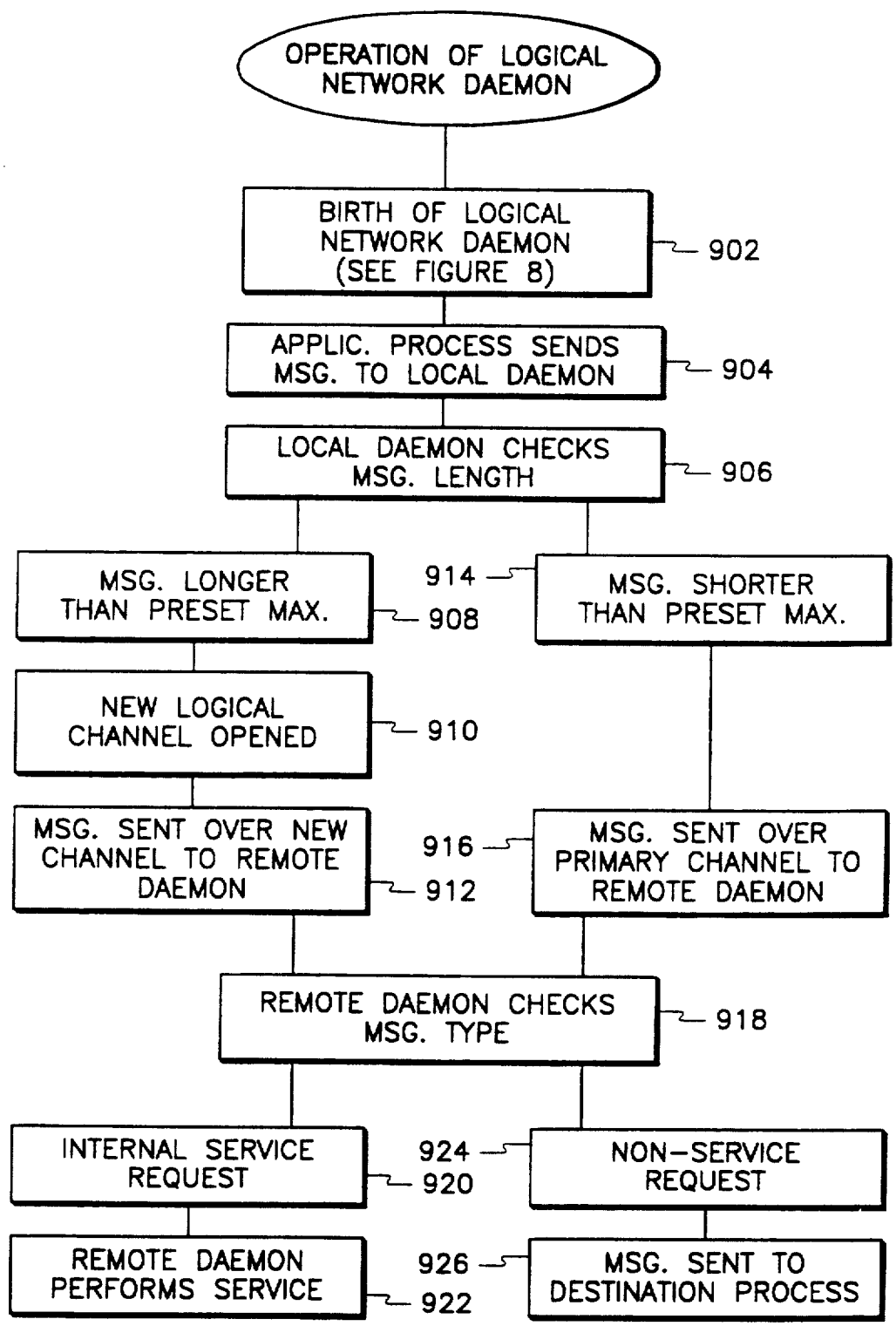
FIG. 9 is a block diagram showing the operation of a logical network daemon after birth.

Referring now to FIG. 9, in an embodiment run under the UNIX operating system, a block diagram depicts the operation of a logical network daemon after its birth.

At a block 902, it is shown that a logical network daemon is born in accordance with FIG. 8. Once the logical network daemon has been born, a block 904 shows that the source application process sends a message to the local daemon for transmission across the network. The local daemon checks the message length as shown at a block 906 and performs a test on the length. If the length of the message to be sent is longer than a preset maximum length as shown at a block 908, then a new logical channel is opened as shown at a block 910 and the message is sent aver the new channel to the remote daemon as shown at a block 912. If the message to be sent is shorter than a preset maximum as shown at a block 9114, then the message is sent over the primary channel to the remote daemon as shown at a block 916. The purpose of this discrimination in message length is to provide an independent channel for long messages, thereby not congesting the primary channel.

Once the message is sent to the remote daemon, the remote daemon checks the message type as shown at a block 918. If the message received by the remote daemon is an internal service request as shown at a block 920, then the remote daemon performs the service as shown at a block 922. Thus, the remote daemon will perform a service request rather than the logical administrative daemon. The logical administrative daemon will, however, perform all service requests which originate and are destined for the same computer (where there is no transmission to a remote process). If the message type is a non-service request, as shown in a block 924, then the message is sent to the destination process as shown at a block 926.

Figure 10:
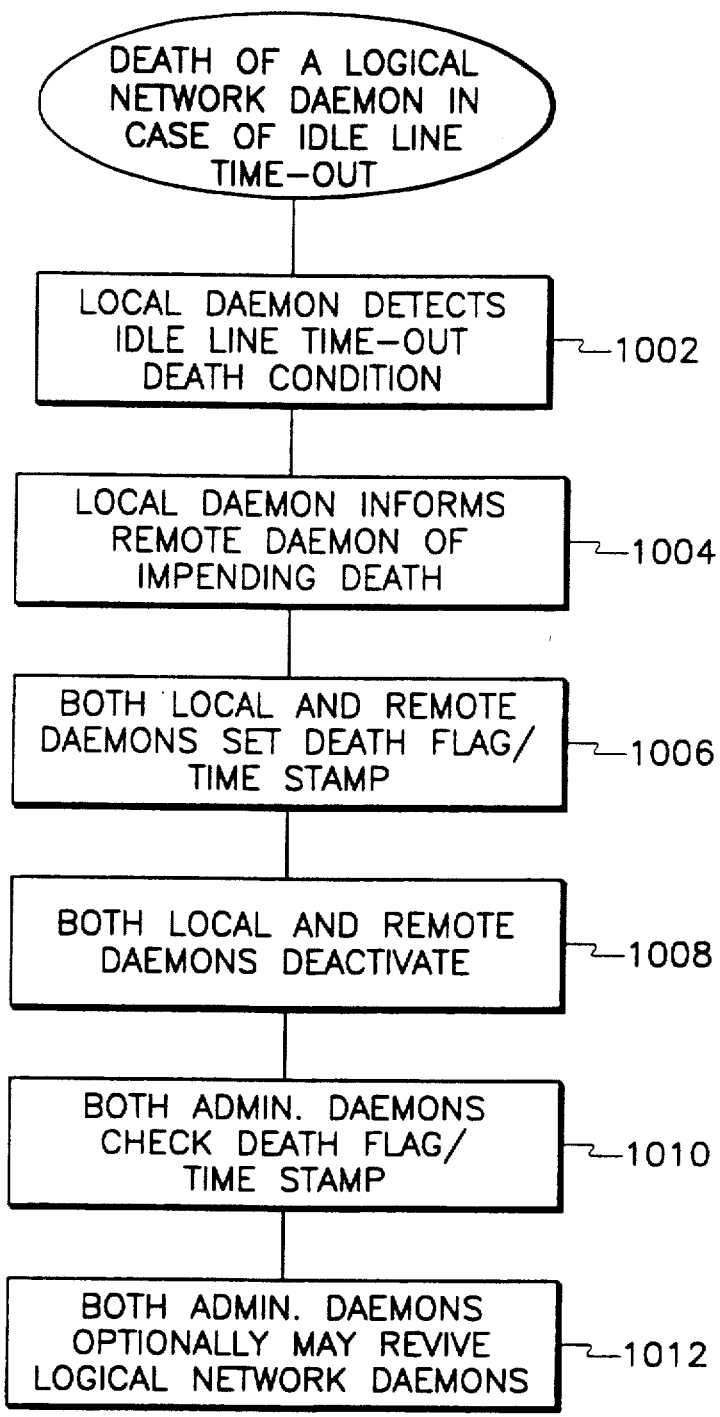
FIG. 10 is a block diagram showing the steps involved in the death (termination) of a logical network daemon in case of idle line timeout.
Figure 11:
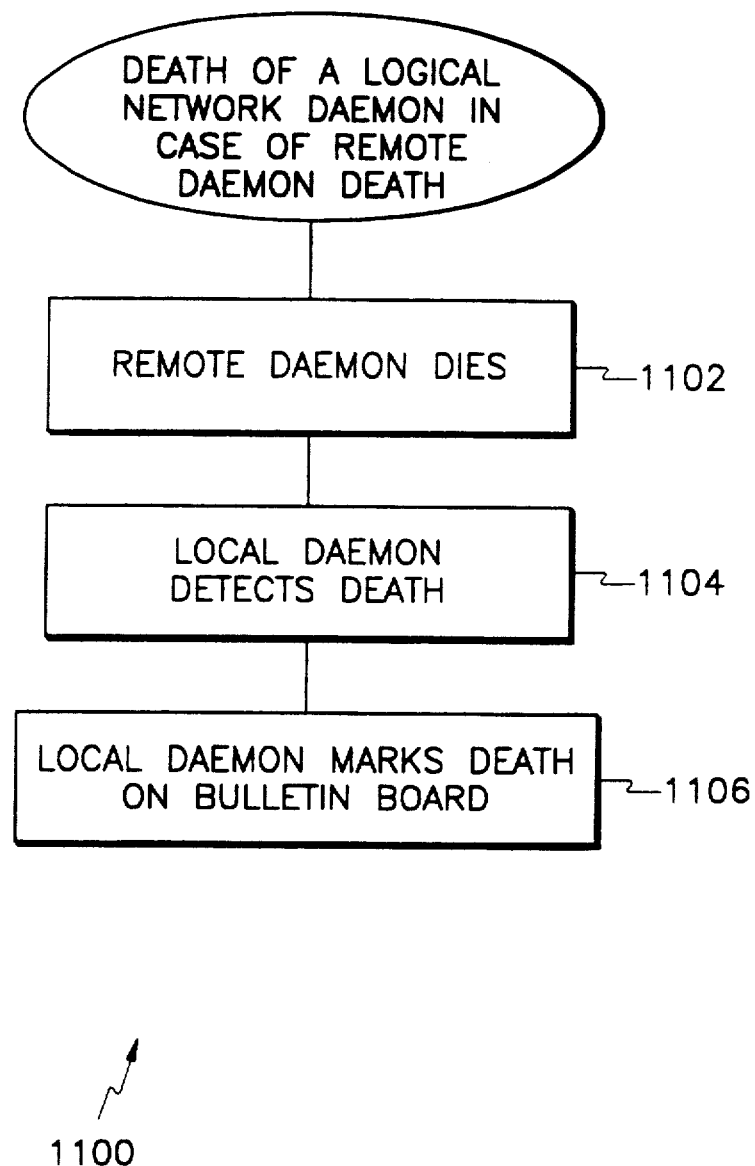
FIG. 11 is a block diagram showing the steps involved in the death of a logical network daemon in case of remote daemon death.

Referring now to FIGS. 10 and 11, in embodiments run under the UNIX operating system, block diagrams depict the steps involved in the death of a logical network daemon.

In FIG. 11, at a block 1002, it is shown that the local logical network daemon detects an idle line time out death condition. An idle line time out indicates that there is no usage of the line and therefore indicates that communication is not needed.

The local logical network daemon then informs the remote logical network daemon of the impending death as shown at a block 1004. Thereafter, both the local and remote logical network daemons set a death flag and time stamp the flag. The death flag records the conditions that caused the death of the logical network daemons. The time of death is also recorded, for future reference, by the logical administrative daemons. Both local and remote logical network daemons thereafter deactivate as shown at a block 1008. The logical administrative daemons check their respective logical network daemon's death flag and determine the time the death occurred. Both logical administrative daemons may then optionally revive the logical network daemons if certain criteria are met which are configured by the system operator/manager as shown in a block 1012.

In FIG. 11, at a block 1102, it is shown that the remote logical network daemon dies (terminates). This termination could be for any reason, and either normal or abnormal. The local logical network daemon detects this death because messages sent from the local daemon to the remote daemon are not acknowledged. The local logical network daemon then posts the death on each bulletin board associated with the local daemon's computer.

The present invention now being fully described, it will be apparent to one of ordinary skill in the art that many changes and modifications can be made thereto without departing from the spirit or scope of the invention.

It should be understood that the present invention is not limited to its preferred embodiments, and that the examples presented above are merely for the purpose of illustration. The scope of the present invention should therefore be defined by the following claims as interpreted by reference to the drawings and specification.

What is claimed is:

1. In a computer-based distributed messaging system for communicating messages between application processes, the system including (1) a plurality of computers remotely located from each other, (2) memory means in the computers, (3) communication means interconnecting the computers and operative to carry messages between the computers, and (4) a plurality of application processes located in various ones of the computers, a method of sending messages between the application processes, the method comprising the following steps carried out by administrative processes in the system;

broadcasting through the communication means, for storage in the memory means of the computers, data indicative of the location and status of each application process when the application process becomes active;

broadcasting through the communication means, for storage in the memory means of the computers, any change in any previously-broadcast status and location data such that the stored data indicative of the locations and statuses of the various application programs are always current in the memory means;

determining, by reference to the location and status data stored in the memory means, the location and status of an application process to which a message generated by another application process is addressed;

if the addressee process is not in an active status, storing the message until such time as the status data indicates that the addressee process has become active;

if the generating and addresses processes are not located in the same computer, sending the message through the communication means to the computer in which the addressee process is located; and if the addressee process is in an active status, delivering the message to the addressee process.

2. A method as in claim 1 wherein, in delivering messages to an addressee process, the administrative processes are responsive to the addressee process to deliver messages to said addressee process according to a criterion specified by said addressee process.

3. A method as in claim 1 wherein, in sending a message, the administrative processes send the message to the computer in which the addressee process is located as soon as the message is ready for sending and store the message at that location until the addresse process become sactive.

4. A method as in claim 1 wherein, in sending a message, the administrative processes store the message at the location of the generating application process until the addressee process is active and then send the message to the computer in which the addressee process is located.

5. A method as in claim 1 and further comprising the step, if an additional computer is activated, of broadcasting through the communication means, for storage in the memory means of the computers, data descriptive of the additional computer.

6. In a distributed computation system that includes a plurality of computers remotely located from each other, communication means interconnecting the computers for carying mesasge therebetween, and a plurality of application processes located in various ones of the computuers, the computers including memory means, a method of sending messages between the application processes, the method comprising:

broadcasting through the communication means, for storage in the memory means, data indicative of the location and status of each application process when the process becomes active;

broadcasting, for storage in the memory means, any changes in any previously-broadcast status and location data;

determining, by reference to the broadcast location and status data stored in the memory means, the location and status of an application process to which a message has been addressed;

storing the message if the addressee process is not ready to receive it; and delivering the message when the addressee process is ready to receive it.

7. A method as in claim 6 wherein the step of delivering the message comprises receiving a message criterion from the addressee process and delivering the message according to the criterion.

8. A method as in claim 6 wherein the steps of storing and delivering the message comprise sending the message to the computer in which the addressee process is located as soon as the message is ready for sending, storing the message at that location until the addressee process is ready to receive the message, and delivering the message when the addressee process is ready to receive it.

9. A method as in claim 6 wherein the steps of storing and delivering the message comprise storing the message at the location of the sending application process until such time as the status data indicates that the addressee process has become active, sending the message through the communication means to the computer in which the addressee process is located if the sending and addressee processes are not located in the same computer, and delivering the message to the addressee process.

* * * * *

UNITED STATES PATENT AND TRADEMARK OFFICE
CERTIFICATE OF CORRECTION

PATENT NO. : 5,230,051
DATED : July 20, 1993
INVENTOR(S) : Suu Quan

It is certified that error appears in the above-indentified patent and that said Letters Patent is hereby corrected as shown below:

Column 5, line 19, "and ho to" should read -- "and how to";

Column 8, line 32, "process i" should read -- "process 1";

Column 8, line 38, "computer and" should read -- "computer 1 and";

Column 8, line 48, "(denoted BBPGN" should read -- "(denoted BBPG$\underline{N}$";

Column 8, line 49, "BBPGN" should read -- "BBPG$\underline{N}$";

Column 9, line 4, "NDN" should read -- "ND$\underline{N}$";

Column 14, line 54, "block 9114" -- should read -- "block 914".

Signed and Sealed this

Fifth Day of April, 1994

Attest:

BRUCE LEHMAN

*Attesting Officer*   *Commissioner of Patents and Trademarks*